US011563578B2

(12) United States Patent
Finchelstein et al.

(10) Patent No.: US 11,563,578 B2
(45) Date of Patent: Jan. 24, 2023

(54) REMOTE SECURED TERMINAL (71) Applicant: KAZUAR ADVANCED TECHNOLOGIES LTD., Tel-Aviv (IL)

(72) Inventors: Daniel Mondy Finchelstein, Rishon Lezion (IL); Yuval Moshe Porat, Tel Aviv-Jaffa (IL); Shlomi Raz Marco, Alfei Menashe (IL)

(73) Assignee: KAZUAR ADVANCED TECHNOLOGIES LTD., Tel-Aviv (IL)

( * ) Notice: Subject to any disclaimer, the term of this patent is extended or adjusted under 35 U.S.C. 154(b) by 209 days.

(21) Appl. No.: 17/041,216

(22) PCT Filed: Mar. 25, 2019

(86) PCT No.: PCT/IL2019/050332
§ 371 (c)(1),
(2) Date: Sep. 24, 2020

(87) PCT Pub. No.: WO2019/186536
PCT Pub. Date: Oct. 3, 2019

(65) Prior Publication Data
US 2021/0014058 A1   Jan. 14, 2021

(30) Foreign Application Priority Data

Mar. 26, 2018   (IL) .......................... 258379

(51) Int. Cl.
*H04L 9/32* (2006.01)
*G06F 21/60* (2013.01)
(Continued)

(52) U.S. Cl.
CPC ............. *H04L 9/32* (2013.01); *G06F 21/606* (2013.01); *H04L 9/088* (2013.01)

(58) Field of Classification Search
CPC ......... H04L 9/32; H04L 9/088; H04L 9/0877; H04L 9/0894; H04L 9/3234;
(Continued)

(56) References Cited

U.S. PATENT DOCUMENTS 5,596,718 A * 1/1997 Boebert ................ G07F 7/0826
713/168
8,180,051 B1 * 5/2012 O'Toole, Jr. .......... G06F 21/556
380/255

(Continued)

FOREIGN PATENT DOCUMENTS

WO   2017/021687 A1   2/2017
WO   2017/120011 A1   7/2017

*Primary Examiner* — Darren B Schwartz
(74) *Attorney, Agent, or Firm* — Browdy and Neimark, P.L.L.C.

(57) ABSTRACT

A computer implemented method for providing communication between a secured client computer and a remote computer. There is provided a client computer that includes peripheral components. Each peripheral component is configured, by a processor, to process a corresponding peripheral component data of a data type that is not compatible with peripheral component data types processed by a processor of other peripheral components. The processor of each peripheral component is further configured to code the corresponding data of the specified data type. Each peripheral component is configured, by the processor, to establish a secured peer-to-peer communication channel between the peripheral component and the remote computer that is authorized to communicate with the client computer, and is further configured to code data that is communicated between the authorized remote computer and the peripheral component through the secured communication channel. The coded data being indecryptable by the processors of other of the peripheral components.

18 Claims, 6 Drawing Sheets (51) Int. Cl.
*H04L 9/08* (2006.01)
*G06F 21/82* (2013.01)
*G06F 21/83* (2013.01)
*G06F 21/84* (2013.01)
*G06F 21/85* (2013.01)
*H04L 12/06* (2006.01)
*H04L 12/50* (2006.01)

(58) Field of Classification Search
CPC ....... H04L 9/3247; H04L 12/06; H04L 12/50; G06F 21/606; G06F 2221/2107; G06F 21/82; G06F 21/83; G06F 21/84; G06F 21/85; G06F 21/60; G06F 21/602
See application file for complete search history.

(56) References Cited

U.S. PATENT DOCUMENTS

| | | | | |
|---|---|---|---|---|
| 8,429,435 | B1* | 4/2013 | Clayton | G06F 1/3209 |
| | | | | 700/19 |
| 8,832,813 | B1* | 9/2014 | Cai | G06F 21/34 |
| | | | | 726/7 |
| 10,284,530 | B1* | 5/2019 | Kuo | H04L 9/0897 |
| 2003/0159053 | A1* | 8/2003 | Fauble | G06F 21/83 |
| | | | | 713/189 |
| 2004/0230668 | A1* | 11/2004 | Carnahan | G06F 13/4022 |
| | | | | 709/217 |
| 2010/0058053 | A1* | 3/2010 | Wood | H04L 9/3247 |
| | | | | 713/155 |
| 2011/0154021 | A1 | 6/2011 | McCann et al. | |
| 2011/0246756 | A1* | 10/2011 | Smith | G06F 21/629 |
| | | | | 713/170 |
| 2013/0145160 | A1* | 6/2013 | Bursell | G06F 21/6218 |
| | | | | 713/168 |
| 2013/0179685 | A1* | 7/2013 | Weinstein | H04L 63/0428 |
| | | | | 713/168 |
| 2013/0311737 | A1* | 11/2013 | Shaw | G06F 21/88 |
| | | | | 711/163 |
| 2014/0067689 | A1* | 3/2014 | Rogers | G06F 21/83 |
| | | | | 705/64 |
| 2014/0068248 | A1 | 3/2014 | Kobres et al. | |
| 2014/0256251 | A1* | 9/2014 | Caceres | H04W 12/084 |
| | | | | 455/41.1 |
| 2014/0321641 | A1* | 10/2014 | Khosravi | H04L 63/061 |
| | | | | 380/44 |
| 2016/0203343 | A1 | 7/2016 | Soffer | |
| 2016/0371511 | A1* | 12/2016 | Balducci | G06F 21/83 |
| 2018/0234390 | A1* | 8/2018 | Camiel | H04L 63/1408 |
| 2019/0034902 | A1* | 1/2019 | Bukovics | G06F 13/10 |
| 2021/0256168 | A1* | 8/2021 | Graham | G06F 21/85 |

* cited by examiner

Fig. 11

REMOTE SECURED TERMINAL

TECHNICAL FIELD

The presently disclosed subject matter relates to remote secured terminals.

BACKGROUND

The ever-increasing usage of cloud-based services has increased the challenge of secured client computers (e.g. remote desktop, laptop, cellular phone and so forth) operating vis-à-vis the remote server (which may reside in the cloud) for achieving both transport security (such as a secured tunnel) and payload security (namely the content transmitted to and from the client computer and the remote server). In order to reduce or eliminate compromising of the client computer (which may adversely affect the transport security and/or the payload security), various approaches have been presented.

For instance, client computers that incorporate Intel® Skylake™ as well as later-introduced platforms, utilize the "Intel Software Guard Extension" (SGX)™ solution which is a new mode of execution of the CPU that creates an enclaved secured environment that can co-exist and co-execute with other codes such as untrusted OS (Open Source) code. The enclaved secured environment will maintain a high level of security, even if peripheral components of the client computer (such as keyboard, screen, camera and so forth) are compromised.

One of the limitations of the specified SGX™ solution is that it operates only with a given specific vendor and platform version.

SUMMARY OF THE INVENTION

In accordance with an aspect of the presently disclosed subject matter, there is presented a computer implemented method for providing communication between a secured client computer and a remote computer, comprising:

(a) providing a client computer that includes at least two peripheral components; each peripheral component is configured, by a processor, to process a corresponding peripheral component data of a data type that is not compatible with peripheral component data types processed by a processor of other of the at least two peripheral components; the processor of each peripheral component is further configured to code the corresponding data of the data type;

the method further comprising with respect to each peripheral component of the components, by the processor:

(b) establishing a secured peer-to-peer communication channel between the peripheral component and the remote computer that is authorized to communicate with the client computer; and (c) coding data that is communicated between the authorized remote computer and the peripheral component through the secured communication channel, the coded data being undecryptable by the processors of other of the peripheral components.

In accordance with an embodiment of the presently disclosed subject matter, there is further presented a method, wherein stage (b) further includes:

i. authenticating the remote computer using a non-symmetric key that includes a public key of the remote computer;

ii. authenticating the peripheral component using a non-symmetric key that includes a private key known to the peripheral component;

iii. establishing a communication key known to the authenticated remote computer and the authenticated peripheral component, the communication key being usable for the data coding between the client computer and the remote computer.

In accordance with an embodiment of the presently disclosed subject matter, there is yet further presented a method wherein the coding data for communicating through the secured communication channel includes:

iv. encrypting data for transmission through the secured communication channel; or v. decrypting data received through the secured communication channel.

In accordance with an embodiment of the presently disclosed subject matter, there is yet further presented a method, wherein two of the at least two peripherals being keyboard and display respectively, and wherein the processor in the keyboard is configured to process corresponding data of keystrokes data type and the processor in the display is configured to process corresponding data of display data type.

In accordance with an embodiment of the presently disclosed subject matter, there is yet further presented a method, wherein the client computer is devoid of a processor module that is separated from any of the at least two peripheral components and wherein the communication between the client computer and remote computer is achieved by means of the at least two peripheral components.

In accordance with an embodiment of the presently disclosed subject matter, there is yet further presented a method, wherein the client computer further includes a processor module that is susceptible of being compromised and further being separated from any of the at least two peripheral components; and wherein stage (b) further includes:

establishing a secured peer-to-peer communication channel between the peripheral component and the processor module; and wherein a secured processor/remote computer peer to peer communication channel is established between the processor module and the remote computer.

In accordance with an embodiment of the presently disclosed subject matter, there is yet further presented a method, wherein stage (c), further comprises:

C1 coding the data giving rise to coded data;

C2 transmitting the coded data to the processor module through the secured communication channel; and for transmitting the coded data from the processor module to the authorized remote computer through the secured processor/remote computer communication channel; the coded data is not decryptable by the processor module that is susceptible to being compromised, thereby achieving secured communication between the peripheral component and authenticated remote computer irrespective of the utilization of the processor module.

In accordance with an embodiment of the presently disclosed subject matter, there is yet further presented a method wherein for at least one group of the peripheral components, the processor is capable of translating data of a first data type associated with one module of the group to data of a second non compatible type of the other module of the group; the method further comprising:

d) establishing a secured peer to peer communication channel with other peripheral component of the group of peripheral components;

e) coding data for communicating between the one peripheral component through the secured communication channel with the other peripheral component; the coded data is undecryptable by other of the peripheral components apart from the group; and f) translating data of the first type to a data of the second type or vice versa, thereby facilitating communication between the group of peripheral components in a common data type.

In accordance with an embodiment of the presently disclosed subject matter, there is yet further presented a method, wherein the authenticated remote computer resides in the cloud.

In accordance with an aspect of the presently disclosed subject matter, there is yet further presented a computer implemented method for providing a communication between a secured client computer and a remote computer comprising:

providing a client computer that includes at least two peripheral components; each peripheral component is configured, by a processor, to process a corresponding peripheral component data of a data type that is not compatible with peripheral component data types processed by processor of other of the at least two peripheral components; the processor of each peripheral component is further configured to code the corresponding data of the data type; the client computer further includes a processor module that is susceptible of being compromised and further being separated from any of the at least two peripheral components; the method further comprising with respect to each peripheral component of the modules:

establishing a secured peer-to-peer communication channel between the peripheral component and the remote computer that is authorized to communicate with the client computer; the establishing secured communication channel includes establishing a communication key known to the remote computer and the peripheral component, the communication key is usable for the data coding between the peripheral component and the remote component;

establishing a secured peer-to-peer communication channel between the peripheral component and the processor module; and wherein a secured processor/remote computer peer to peer communication channel is established between the processor module and the remote computer.

In accordance with an embodiment of the presently disclosed subject matter, there is yet further presented a method, further comprising: coding data giving rise to coded data; transmitting the coded data to the processor module through the secured communication channel; and for transmitting the coded data from the processor module to the authorized remote computer through the secured processor/remote computer communication channel; the coded data is not decryptable by the processor module that is susceptible to being compromised, thereby achieving secured communication between the client computer and authenticated remote computer, irrespective of the utilization of said processor module that is susceptible of being compromised.

In accordance with an embodiment of the presently disclosed subject matter, there is yet further presented a method, further comprising: receiving by the processor module providing coded data transmitted by the authorized remote computer through the secured processor/remote computer communication channel; the coded data is not decryptable by the processor module, receiving the coded data by the peripheral component through a corresponding secured communication channel, and by the processor of the peripheral component, decrypting the coded data, thereby achieving secured communication between the peripheral component and authorized remote computer, irrespective of the utilization of the processor module, irrespective of the utilization of the processor module that is susceptible of being compromised.

In accordance with an aspect of the presently disclosed subject matter, there is yet further presented a computer implemented method for providing a secured client computer, comprising: a client computer that includes at least two peripheral components; each peripheral component is configured, by a processor, to process a corresponding peripheral component data of a data type that is not compatible with peripheral component data types processed by a processor of other of the at least two peripheral components; the processor of each peripheral component is further configured to code the corresponding data of the data type; wherein for at least one group of the peripheral components, the processor is capable of translating data of a first data type associated with one module of the group to data of a second non compatible type of the other module of the group, the method further comprising:

a. establishing a secured peer-to-peer communication with other peripheral component of the group of peripheral components;

b. coding data for communicating between the one peripheral component through the secured communication channel with the other peripheral component; said coded data is undecryptable by other of the peripheral components apart from the group;

c. translating data of the first type to a data of the second type or vice versa, thereby facilitating communication between the group of peripheral components in a common data type.

In accordance with an aspect of the presently disclosed subject matter, there is yet further presented a computer implemented system for providing communication between a secured client computer and a remote computer, comprising:

a client computer that includes at least two peripheral components; each peripheral component is configured, by a processor, to process a corresponding peripheral component data of a data type that is not compatible with peripheral component data types processed by a processor of other of the at least two peripheral components; the processor of each peripheral component is further configured to code the corresponding data of the data type;

each peripheral component of the components, by the processor is configured:

to establish a secured peer-to-peer communication channel between the peripheral component and the remote computer that is authorized to communicate with the client computer; and to code data that is communicated between the authorized remote computer and the peripheral component through the secured communication channel, the coded data being undecryptable by the processors of the peripheral components.

In accordance with an embodiment of the presently disclosed subject matter, there is yet further presented a system, wherein the client computer is devoid of a processor module that is separated from any of the at least two peripheral components and wherein the communication between the client computer and remote computer is achieved by means of the at least two peripheral components.

In accordance with an embodiment of the presently disclosed subject matter, there is yet further presented a system, wherein the processor of the authenticated remote computer is configured to receive, from a first authenticated peripheral component of the components and through a corresponding first trusted channel, a coded data of a first data type, decoding it using a first communication key associated with the first peripheral component and translating it to a processable data; the processor is further configured to translate processable data to data of a second data type, code it with a second communication key associated with a second authenticated peripheral component and transmit it through a corresponding second trusted channel to the second authenticated peripheral component.

In accordance with an embodiment of the presently disclosed subject matter, there is yet further presented a system, wherein the authenticated remote computer resides in the cloud.

In accordance with an aspect of the presently disclosed subject matter, there is yet further presented a computer implemented system for providing a communication between a secured client computer and a remote computer comprising:

a client computer that includes at least two peripheral components; each peripheral component is configured, by a processor, to process a corresponding peripheral component data of a data type that is not compatible with peripheral component data types processed by processor of other of the at least two peripheral components; the processor of each peripheral component is further configured to ode the corresponding data of the data type; the client computer further includes a processor module that is susceptible of being compromised and further being separated from any of the at least two peripheral components:

each peripheral component of the components, by the processor is configured: to establish a secured peer-to-peer communication channel between the peripheral component and the remote computer that is authorized to communicate with the client computer, including establishing a communication key known to the remote computer and the peripheral component, the communication key is usable for the data coding between the peripheral component and the remote component;

to establish a secured peer-to-peer communication channel between the peripheral component and the processor module; and wherein a secured processor/remote computer peer to peer communication channel is established between the processor module and the remote computer.

In accordance with an aspect of the presently disclosed subject matter, there is yet further presented a computer implemented system for providing a secured client computer, comprising:

a client computer that includes at least two peripheral components; each peripheral component is configured, by a processor, to process a corresponding peripheral component data of a data type that is not compatible with peripheral component data types processed by a processor of other of the at least two peripheral components; the processor of each peripheral component is further configured to code the corresponding data of the data type; wherein for at least one group of the peripheral components, the processor is capable of translating data of a first data type associated with one component of the group to data of a second non compatible type of the other component of the group, peripheral component of said components, by the processor is configured:

to establish a secured peer-to-peer communication with other peripheral component of the group of peripheral components;

to code data for communicating between the one peripheral component through the secured communication channel with the other peripheral component; the coded data is undecryptable by other of the peripheral components apart from the group;

to translate data of the first type to a data of the second type or vice versa, thereby facilitating communication between the group of peripheral components in a common data type.

In accordance with an embodiment of the presently disclosed subject matter, there is yet further presented a non-transitory computer-readable memory tangibly embodying a program of instructions executable by the computer for executing the method stages of the various embodiments of the presently disclosed subject matter.

Embodiments that are described within the context of an aspect of the invention may likewise be applied to other aspects of the invention, mutatis mutandis.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, modules and circuits have not been described in detail so as not to obscure the presently disclosed subject matter.

Unless specifically stated otherwise, as apparent from the following discussions, it is appreciated that throughout the specification discussions utilizing terms such as "authenticating", communicating", "transmitting", "coding", translating", "facilitating", "providing". "establishing", "processing", "computing". "representing", "comparing", "generating", "assessing". "matching". "updating" or the like, refer to the action(s) and/or process(es) of a computer that manipulate and/or transform data into other data, said data represented as physical, such as electronic, quantities and/or said data representing the physical objects. The term computer or processor should be expansively construed to cover any kind of hardware-based electronic device or devices with data processing capabilities including, by way of non-limiting example client computer, remote computer, processor, the processor module discussed herein.

The term "non-transitory storage medium" used herein should be expansively construed to cover any volatile or non-volatile computer memory suitable to the presently disclosed subject matter.

The operations in accordance with the teachings herein may be performed by a computer specially constructed for the desired purposes, or by a general-purpose computer specially configured for the desired purpose, by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

Figure 1:
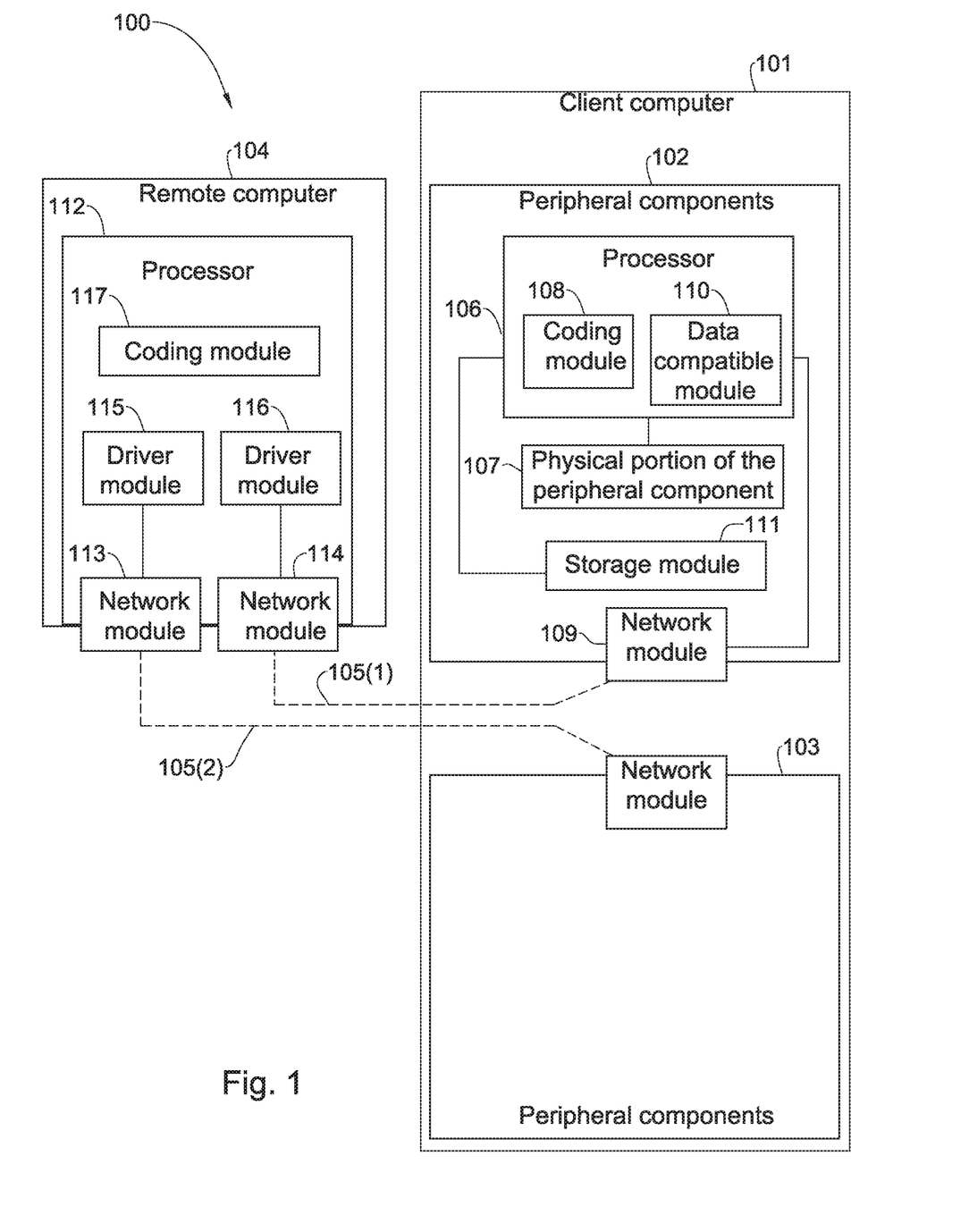
FIG. 1 illustrates a functional block diagram of a system for providing a secured client computer, in accordance with certain embodiments of the presently disclosed subject matter.

Bearing this in mind, attention is drawn to FIG. 1 illustrating a functional block diagram of a system in accordance with certain embodiments of the presently disclosed subject matter. The illustrated system 100 includes a client computer 101 that by this example may include two peripheral components 102 and 103. The client computer may be coupled to a remote computer 104 (e.g. a server residing in the cloud) through a known per se network (designated collectively as 105) and is configured to provide a secured communication between the peripheral components and the remote computer 104. Non-limiting examples of peripheral components are input components such as keyboard microphone, tracking device or combination thereof (e.g. keyboard and mouse)., output components such as display components and/or others (not necessarily input or output. Each peripheral component is configured to process a corresponding peripheral component data of a given data type. For instance, in the case of a keyboard component, the data type may be keystroke related data such as scan code or key code. Note that the data type associated with a given peripheral component (e.g. keyboard) may be different than that of one (or more than one) of other peripheral component(s) (e.g. display). In accordance with certain embodiments, there may be other two or more peripheral components (either of identical type, say two keyboards or of different types) whose data type are compatible, one with the other. In accordance with certain embodiments, the physical portion of the peripheral component 107 (e.g. screen in case of display, the physical keyboard keystrokes and the pertinent electronics/hardware) may be associated with a processor 106 for generating and processing data including the specified data type.

The processor 106 may be configured to execute a coding module 108 for coding the corresponding data of the specified data type, all as will be explained in greater detail below. The network module is configured to facilitate communication, e.g. with remote computer 104. As will be further discussed below, the processor may be configured to execute data compatible module 110 (e.g. a driver) for translating data of a given data type, to another type which may be compatible with the other data type. FIG. 1 further illustrates storage module 111 (non-transitory computer-readable storage medium) for storing data such as private keys, all as will be explained in greater detail below.

The coding module 108 as well as the network module 109 (the latter may facilitate communication with the remote server 104 through network 105) may reside on one or more System On Chips (SOCs), as will be explained with reference to FIG. 2 below.

Note that in accordance with certain embodiments, the peripheral components (in the example of FIG. 1 only 2 out of possibly N (N>2) are shown) may form part of a client computer 101 such as laptop, desktop, cellular device and others known per se, or in accordance with certain other two or more of the peripheral components may reside remotely and communicate by means of a network, thereby not necessarily residing in one physical client computer, all as known per se.

Peripheral component 103 may include similar blocks and modules mutatis mutandis. For instance, in cases where the peripheral component 103 is a display, the physical component 107 may be different and suitable for a display component.

Turning now to remote computer 104, it includes a processor 112, network modules 113 and 114 for communication with the respective peripherals 102 and 103. The processor 112 may be configured to execute driver modules 114 and 115 that may form part of data compatibility module(s) for translating between non-compatible data types, e.g. the driver 115 may translate keystrokes data type received from the keyboard component 102 through network module 112 (via secured channel 105(1)—all as will be discussed in greater detail below) for further processing by appropriate application module (not shown) running on processor 112. Likewise, the driver 116 may translate output data processed by appropriate application module (not shown) running on processor 112 into display type data that will be transmitted through network module 114 (via secured channel 105(2), all as will be discussed in greater detail below) to display component 103. In cases where the communicated data to the remote server is coded e.g. encrypted (as will be explained in greater detail below), the remote computer may utilize the coding module 117 for. e.g. decrypting the data and/or vice versa for encrypting data that will be decoded by the coding module of the peripheral component. The processor is operatively coupled to a storage module (non-transitory computer-readable storage medium)—not shown in FIG. 1.

The invention is not bound by the specified architecture of the remote computer, which is provided by way of example only and any known per se architecture may be applicable.

Note also that whereas in the embodiments of FIG. 1, the peripheral components are accommodated in a one local client computer 101, this is not necessarily always the case, and accordingly two or more of the components may communicate through a network and therefore may not necessarily reside in the same physical location. Thus, in accordance with certain embodiments the client computer may be a local computer residing in one location, or in accordance with other embodiments not necessarily residing in one location.

Figure 2:
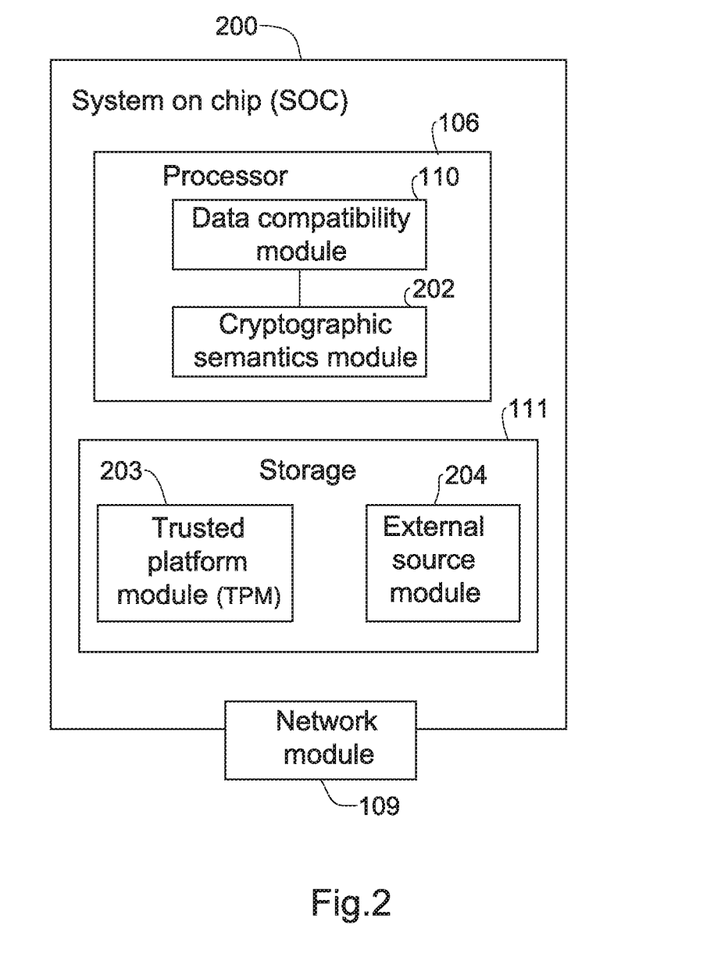
FIG. 2 illustrates a functional block diagram of a System On Chip (SOC) in accordance with certain embodiments of the presently disclosed subject matter.

Turning now to FIG. 2, this illustrates a functional block diagram of a more detailed System On Chip (SOC) 200 in accordance with certain embodiments of the presently disclosed subject matter. Thus, SOC 200 may include the processor 106 that is configured to execute data compatibility module 110 including for example driver(s). The processor may be further configured to the coding module that by this embodiment includes cryptographic semantics module 202 capable of performing cryptographic operations. The processor is operatively coupled to the storage 111 that includes by this example a Trusted Platform Module (TPM) 203 and External Source module 204 capable of reading external validation and configuration data (e.g. from smart card. Subkey and Nitrokey, etc.). The operations of the specified modules will be explained in greater detail below. The network module 205 may be for example a communication stack, utilizing one or more of 803.11X, Bluetooth (LE) Thunderbolt and so forth. While the description with reference to FIG. 1 utilizes one SOC, it may likewise use two or more SOCs which may collectively have similar or modified functionality as the one described with reference to FIG. 2.

Thus, with reference to FIGS. 1, 2 above and 5 and 9 below, the processor (106) (or 112, whichever the case may be) can be configured to execute several functional modules in accordance with computer-readable instructions implemented on a non-transitory computer-readable storage medium.

It is noted that the teachings of the presently disclosed subject matter are not bound by the system and/or computer and/or processor system described with reference to FIG. 1. Equivalent and/or modified functionality can be consolidated or divided in another manner and can be implemented in any appropriate combination of software with firmware and/or hardware and executed on a suitable device. Those skilled in the art will also readily appreciate that the data storage can be consolidated or divided in another manner; databases can be shared with other systems or be provided by other systems, including third party equipment.

For purpose of illustration only, the following description is provided for establishing secured communication between peripheral components. Those skilled in the art will readily appreciate that the teachings of the presently disclosed subject matter are, likewise, applicable to secured communication between peripheral component(s) and remote computer(s).

Figure 3:
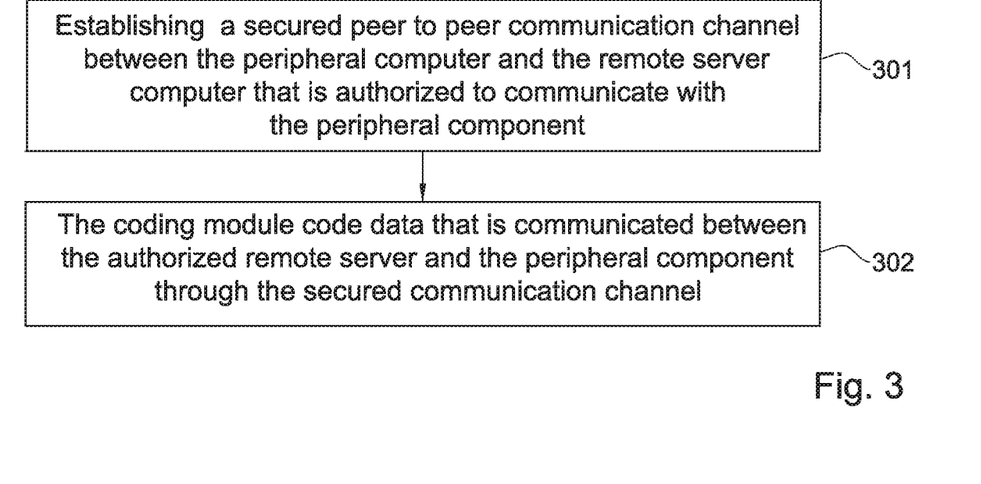
FIG. 3 illustrates a generalized flow-chart of a sequence of operations in a system of FIG. 1, in accordance with certain embodiments of the presently disclosed subject matter.

Bearing this in mind, attention is drawn to FIG. 3 illustrating a generalized flow-chart of a sequence of operations for establishing secured communication between the remote commuter (say 104 of FIG.) and one or more peripheral components say 102 and/or 103 (which resides, or not, in the same client's computer), in accordance with certain embodiments of the presently disclosed subject matter. Thus, at the onset, the peripheral component may establish a secured peer-to-peer communication channel between the peripheral component and the remote server computer that is authorized to communicate with the peripheral component (301). This may generate a secured channel (e.g. tunnel) and facilitate communication of a secured payload (e.g. the coded data) through the secured tunnel. In the example of FIG. 1, and assuming that the peripheral component 102 is for example a keyboard, the secured communication channel is depicted schematically as $105_1$. As a result the communication channel between the peripheral component is secured as well as the content (even if theoretically the communication channel is compromised).

Next, the peripheral component may utilize 302 said coding module to code data that is communicated between the authorized remote server (e.g. 104) and the peripheral component through said secured communication tunnel, said coded data (e.g. the specified coded payload) being undecryptable by the coding modules of other (in accordance with certain embodiments all other) of said peripheral components. The term un (or not or cannot etc.) decipherable (or decryptable) used herein should be construed to include: cannot be deciphered (decryptable) by using reasonably available processing power, for instance using at least 2048 bits for non-symmetric key or at least 256 bits for symmetric key. These values may vary depending upon the available reasonable processing power which is likely to improve over time.

Figure 4:
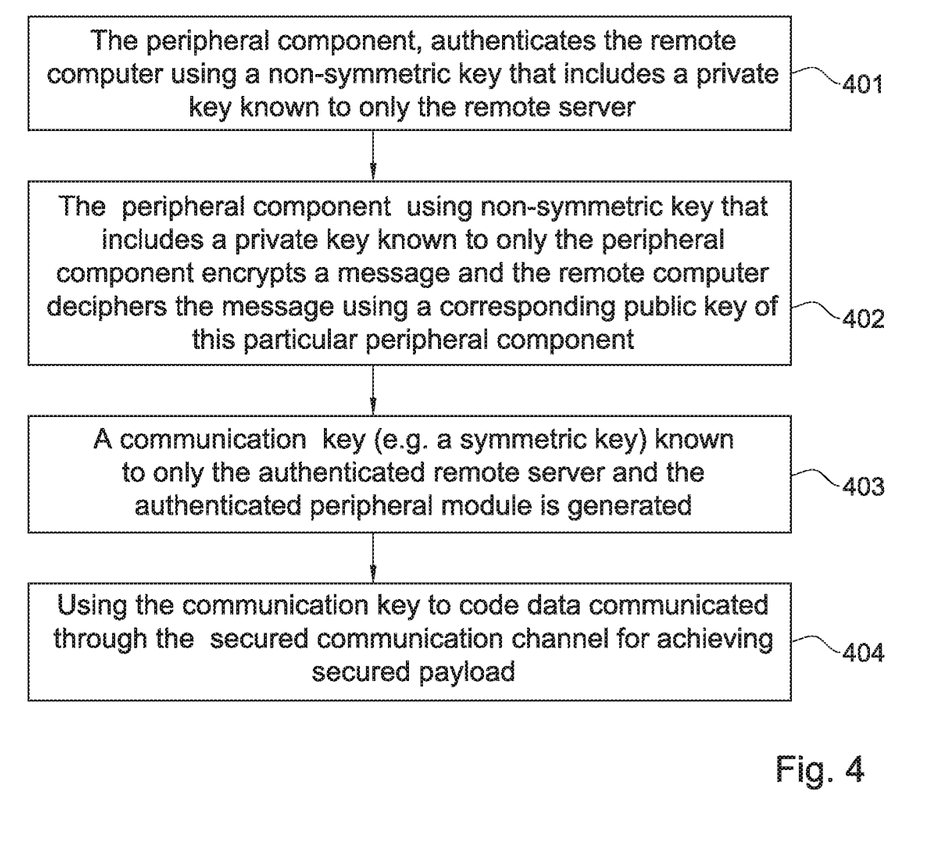
FIG. 4 illustrates flow chart of a sequence of operations of establishing a secured communication channel, between a peripheral component and a remote computer, in accordance with the presently disclosed subject matter.

Turning now to FIG. 4, this illustrates a flow chart of a sequence of operations of establishing a secured communication channel between a peripheral component and a remote computer that was discussed in FIG. 3, in accordance with certain embodiments of the invention. Thus, in 401 the peripheral component, say 102, may authenticate the remote server using a non-symmetric key that includes a private key known to only the remote server. More specifically, the remote server may send a message signed by its private key, and the peripheral component may extract the corresponding public key of the remote server (extracted e.g. from external trusted source) and decipher, (using the remote server's public key), the so-encrypted message, thereby authenticating the remote server.

Then, 402 the peripheral component, using a non-symmetric key that includes a private key known to the peripheral component (and extracted e.g. from the TPM)—[and possibly known to only the peripheral component], may encrypt the message and the remote computer may then decipher the message using a corresponding public key of this particular peripheral component, thereby authenticating the peripheral component. Once dual authentication has been achieved, a secured peer-to-peer communication channel between the client computer and the remote server is established.

Note that throughout the description and Claims, encrypting using a non-symmetric key (e.g. a private key) may be construed as an example of "signing" and decryption (deciphering) using a corresponding non-symmetric key (e.g. public key) may be construed as an example of "verification".

Then, in 403 a communication key (e.g. a symmetric key) known to the authenticated remote server and the authenticated peripheral component (and possibly not to other peripheral components), is generated. The symmetric key is usable for the data coding between the client computer and the remote server. By one example, in order to establish the communication key, the peripheral component may extract proprietary data from either or both of the TPM 203 and from the external source data 204, and combine them, thereby generating the communication key. The invention is not bound by this specific manner of generating the communication key.

In accordance with certain embodiments, in order to send the communication key to the authenticated remote server, the so generated communication key may be encrypted by the private key of the peripheral component and by the public key of the remote computer and transmitted from the authenticated peripheral component to the remote computer, through the already established secured channel (e.g. 105) between them. Since the communication key was encrypted by the public key of the remote computer, this guarantees that only the already authenticated remote server (see stage 401) can decipher it (using its corresponding private key, known only to it). The remote computer, in turn, will use the public key of the already authenticated peripheral component (see 401 above) in order to decipher and extract the communication key that was encrypted by the corresponding private key of the peripheral component. Thus, a communication key is established between the authenticated peripheral component and the authenticated remote computer and is known only to them for transmitting coded data (secured payload).

The invention is not bound by the specified manner of establishing the communication key. For instance, the procedure may commence from the remote computer which defines the communication key, encrypt it with its private key, and then with the public key of the authenticated peripheral component. The authenticated peripheral component, in turn, will use the authenticated remote computer public key and its own private key to decipher and extract the communication key, for transmitting code data and achieving secured payload.

The computational stages described above (at the peripheral component side) may be performed e.g. at the cryptographic semantic module 202 (FIG. 2) running on processor 106, and computational stages discussed above (with reference to the remote computer) may be performed at coding module 117 running on processor 111 (FIG. 1).

Having established a secured communication key, it may be used 404 e.g. by the coding module 108 (e.g. cryptographic semantics module 202) to code data communicated through the secured communication channel for achieving a secured payload. This may include encrypting data for transmission through said secured communication channel (e.g. tunnel) or decrypting data received through said secured communication tunnel.

The same holds true for the other peripheral component 103 (say a display) establishing a secured communication channel (depicted schematically as 105₂) with remote computer 104.

There follows a non-limiting example of a sequence of operations for establishing a secured communication between a keyboard peripheral component (where, as shown in FIG. 2, the physical component 107 represents a physical keypad and processor 106 processes the pertinent data and a remote server). The invention is of course not bound by this example.

a. Keyboard—Client Side (e.g. 102 in FIG. 1)
    i. User plugs in external validation device (Smartcard. Nitrokey, etc.).
    ii. User authenticates to the device. (e.g. via biometric identification)
    iii. TPM (203) validates the state of the firmware, and, if valid, boots the firmware.
    iv. Firmware reads configuration data from the external validation device (204).
      Configuration information includes (but is not limited to):
        1. Local network configuration and credentials
        2. Remote host configuration and credentials
          The specified stages (i) to (iv) illustrate in a non-limiting manner stages of validating the chip and authenticating the user. Some of the data may be used for later stages for instance the address of the remote computer to be authenticated and/or user data—e.g. biometric data and/or user password that may form e.g. part of the communication key.
    v. Firmware provisions the device based on currently read configuration (configuration information is transient in nature). Having validated the specific keyboard peripheral component, and having extracted the component's configuration and undergone component's initialization, then
    vi. The keyboard component establishes a secured channel (by this example a secure transport (e.g. VPN)) to the remote computer (server), including authenticating the peripheral component and the remote computer as described with reference to FIGS. 3 and 4 above (e.g. based on provided configuration data
    vii. A symmetric key (an example of communication key) is generated between the authenticated devices, as discussed with reference to FIGS. 3 and 4 above, including by this example keystrokes from the keyboard are read, encrypted to a second provided key (based on the same external key store). This is to create an end-to-end encryption (payload encryption) as well as transport encryption.
    viii. Encrypted payload (an example of code data) is then transmitted (using the communication key) over the secure channel (tunnel) between the keyboard component and to the remote computer.
      Note, that in accordance with certain embodiments, transport layer may be terminated at an edge device (e.g. firewall, VPN concentrator, etc.), however, it can be terminated at the host operating system level.
  b. Remote Computer Side (e.g. 104 in FIG. 1)
    i. Transport Layer (e.g. VPN) established. This is the corresponding secured channel part (see (vi) at client side) that is performed at the remote computer side
    ii. Client Device authenticated based on client provisioned keys. (Authenticating the keyboard peripheral—as discussed above).
    iii. Upon successful authentication, a virtual device is presented to the remote computer Operating System—Virtual HID (Keyboard).
    (iv) Coded data is received or transmitted using the so established communication (e.g. symmetric) key (which the remote computer has participated in its generation), as discussed before. For instance, Ingress encrypted payloads (e.g. using the specified symmetric key) are decrypted by a software driver resulting in non-encrypted standard scancode.

(v) Scancodes are delivered to the OS via the device's driver.

Bearing all this in mind, coded data may be exchanged between the authenticated remote server and a given authenticated peripheral component (say 102—e.g. keyboard) through a secured channel (e.g. 105$_1$) where this coded data is not decipherable by any other peripheral components. By the same token, utilizing the specified sequence of FIG. 3 (and say the specific embodiment of FIG. 4) between the remote computer and a different peripheral component (say display 103), coded data (typically of a different type) may be exchanged between the authenticated remote server and the different peripheral component through a different secured channel (e.g. 105$_2$) where the coded data designated to or having originated from a given authenticated peripheral component, is not decipherable by any other peripheral component.

Considering the non-limiting scenario that two or more secured peripheral components (in the manner specified) reside in the same local computer (or even peripherals not residing in the same physical location), then a secured local computer is achieved, which is significantly more secured than, say, a local computer that utilizes a processor that is susceptible of being compromised such as general purpose processor, that may be inherently compromised by third party hacking. This definition of a processor that is susceptible of being compromised may encompass a processor (e.g. CPU) that does not include a system/feature to restrict access to memory sections for specific processes in a way that allows only these processes to access to that memory using specific commands that are implemented by the CPU. In such CPUs, the OS kernel is able to read the contents of the computation done on the CPU at that time, hence a compromised kernel will compromise any computation done on that CPU. The invention is not bound by this definition.

Moreover, in a local computer (or even peripherals not residing in the same physical location) in accordance with certain embodiments substantially no data is retained at the client side but rather only at the secured remote server (e.g. in the cloud).

This solution in accordance with certain embodiments is also less costly and more compatible than, say, a local computer that incorporates say, the Intel® Skylake™ and later-introduced platforms which utilize the "Intel Software Guard Extension" (SGX)™ for achieving a secured environment. The invention is not bound by the specified SGX™.

This solution is also advantageous in accordance with certain embodiments by virtue of the fact that in order to have "full picture" of the activities at the client computer there may be a need to hack not only one peripheral components but rather all (or nearly all of them) which is harder due to the fact that each peripheral component is secured independently of the other.

In the architecture utilized for example in FIG. 1, that utilizes the teachings in accordance with various embodiments of the invention, the absence of "general purpose" processing capabilities in the client computer (employing just peripheral components) may be fulfilled by the processing capacity of the remote computer which may be for example a server residing on a remote protected cloud environment.

It is noted that the teachings of the presently disclosed subject matter are not bound, neither by the flow chart illustrated in FIGS. 3 and 4, nor by the specific modules illustrated in FIGS. 1 and 2. For instance, the illustrated operations can occur out of the illustrated order. Some of the operations may be executed substantially concurrently or in the reverse order.

Figure 5:
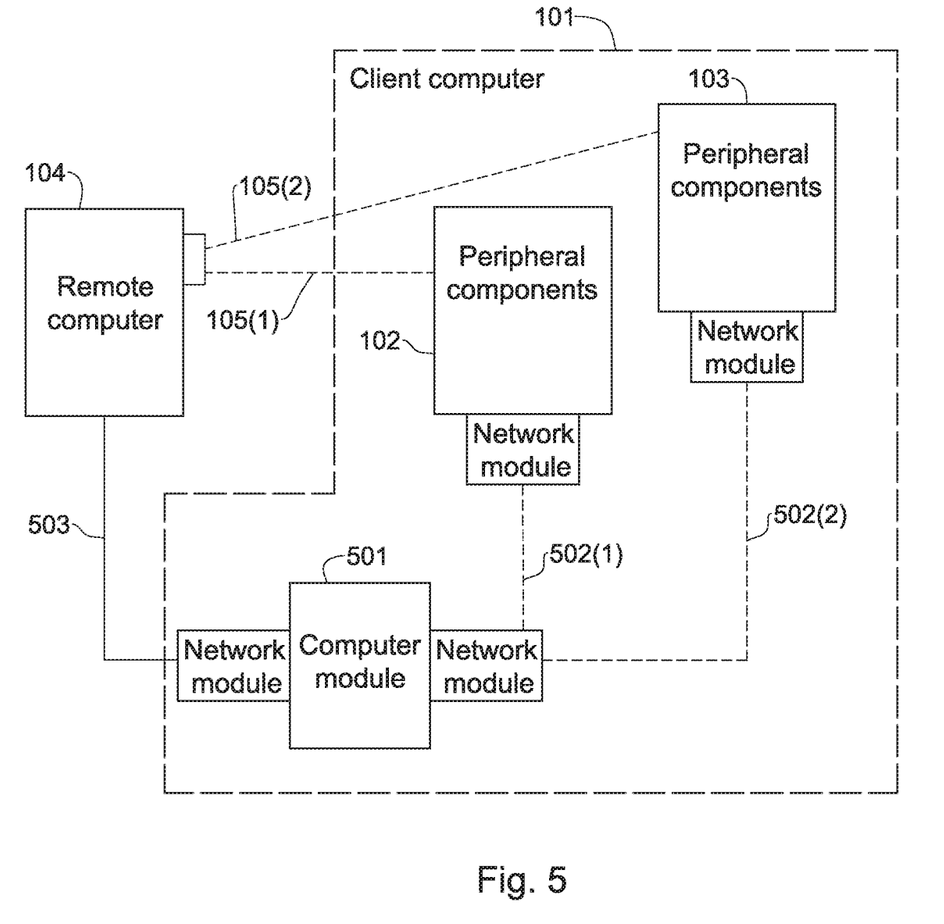
FIG. 5 illustrates a functional block diagram of a system for providing a secured client computer, in accordance with certain embodiments of another aspect of the presently disclosed subject matter.

Attention is now drawn to FIG. 5 illustrating a functional block diagram of a system for providing a secured client computer, in accordance with another aspect of the presently disclosed subject matter. The peripheral components (e.g. 102 and 103—and possibly others not shown in FIG. 5) as well as the remote computer 104 are similar to those described with reference to FIGS. 1 and 2, and may be accommodated in client computer 101 which, by this embodiment, may include an additional processing capacity, for instance by employing a computer module 501 that is susceptible to being compromised. The latter may be for example a commercially available CPU fitted in a client computer, such as commercially available Intel™ or AMD™ CPUs. The term susceptible to being compromised should be construed to include a processor which is susceptible of being compromised by applying reasonable third party hacking techniques and as defined by way of non-limiting example above. As readily arises from FIG. 5, the communication between the peripheral component and the remote computer passes through the computer module 501, and by virtue of the characteristics of susceptible to being compromised computer module 501, any data that originates from a peripheral component and the remote server or vice versa, cannot be considered as secured because it may be hacked at processor module 501.

Accordingly, while processor module 501 may add computational capacity to the client computer (compared, for example, to the embodiment of FIG. 1), it is susceptible to being compromised, which is a clear disadvantage. There is thus provided a method for obtaining secured communication between a client computer and a remote server in an architecture that employs also a processor module that is susceptible to being compromised.

Accordingly, in accordance with certain embodiments, each of the peripheral components may establish a secured peer-to-peer communication channel between the peripheral component (say 102) and a remote computer (say 104) that is authorized to communicate therewith. To this end, a secured communication channel may be established (e.g. 105$_1$) that includes establishing a communication key (e.g. symmetric key) known to only the remote computer (104) and the peripheral component (102), and the communication key is usable for the data coding between the peripheral component and the remote computer, all as explained in detail above with reference to FIGS. 1 to 4.

Figure 6:
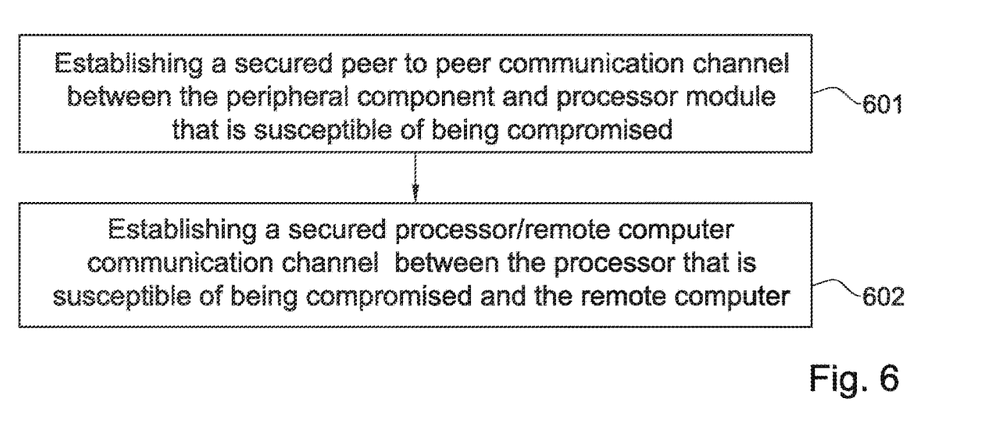
FIG. 6 illustrates a generalized flow-chart of a sequence of operations for generating a secured communication channel in a system of FIG. 5, in accordance with certain embodiments of the presently disclosed subject matter.

Turning now to FIG. 6, this illustrates a generalized flow-chart of a sequence of operations for generating a secured communication channel in a system of FIG. 5, in accordance with certain embodiments of the presently disclosed subject matter.

For convenience, whenever the term processor module 501 is used, it should be meant to refer to a processor module that is susceptible to being compromised in the matter discussed above.

Thus, in 601 a secured peer-to-peer communication channel (say 502(1)) is established between the peripheral component (say 102) and processor module (say 501). In 602 a secured processor/remote server peer-to-peer communication channel (say 503) is established between the processor 501 and the remote computer 104. In a similar fashion, in 601 a secured peer-to-peer communication channel (say 502(2)) is established between the peripheral component (say 103) and the processor module (say 501). Generation of the specified secured communication channel includes authenticating the respective peripheral component (102 and 103) and the compute (501), thereby achieving a secured transport ((502(1) and (502(2), respectively) in a similar mutatis mutandis process of establishing a secured transport channels (105(1) and 105(2) as described in detail with reference to FIG. 1 and the pertinent flow chart of FIGS. 3 and 4.

Figure 7:
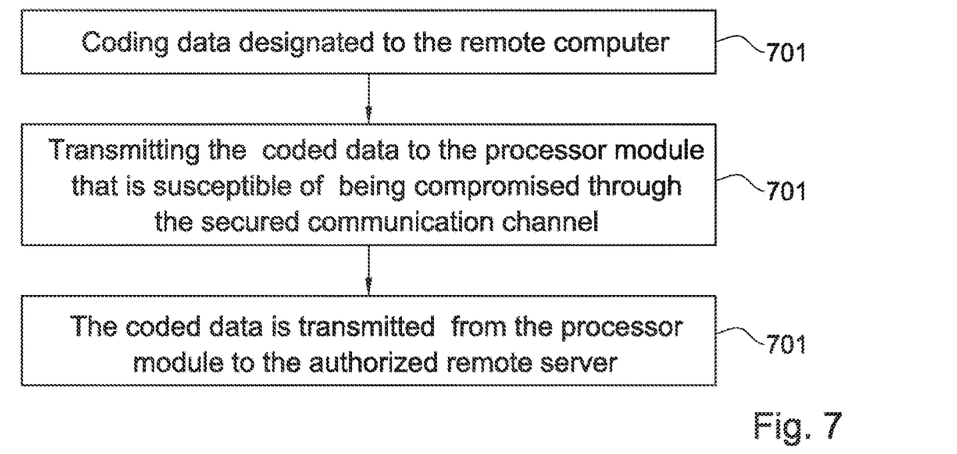
FIG. 7 illustrates a sequence of operations for utilizing the secured communication channels established e.g. in accordance with the flow chart of FIG. 6, in accordance with certain embodiments of the presently disclosed subject matter.

Attention is now drawn to FIG. 7, illustrating a sequence of operations of utilizing the secured communication channels established e.g. in accordance with the flow chart of FIG. 6, in accordance with the presently disclosed subject matter.

More specifically, in 701 the coding module of the peripheral component (say 102) may be utilized to code data (say coded keyboard strokes) designated to the remote computer. Then, in 702 the coded data may be transmitted to the processor module through the secured communication channel (e.g. 502(1)). Then, the coded data may be transmitted 703 from the processor module to the authorized remote server (say 104) through the already established secured processor/remote server communication channel 503.

Note that the coded data (say the coded keystrokes) may not be decrypted by the processor module because the coded data was generated by using a communication key (say symmetric key) known to the peripheral component (say 102) (and possibly only to the peripheral component and not other peripheral components) and the remote computer (say 104), and, accordingly, even if the processor 501 is compromised and the coded data is intercepted within the processor 501, it cannot be deciphered and therefore a secured communication between the client computer and authorized server computer (the remote computer) is achieved, irrespective of the utilization of said processor module.

Figure 8:
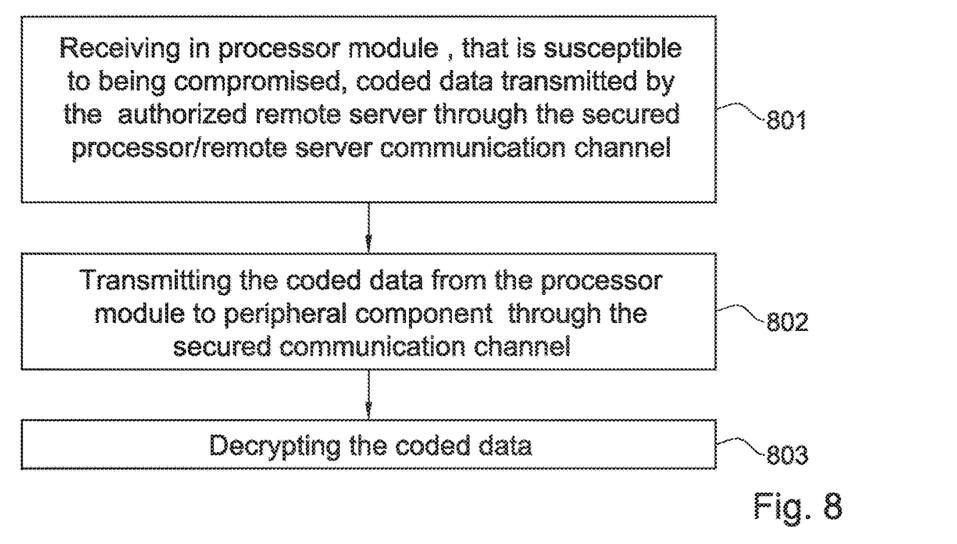
FIG. 8 illustrates a sequence of operations for utilizing the secured communication channels established e.g. in accordance with the flow chart of FIG. 6, in accordance with certain other embodiments the presently disclosed subject matter.

With reference to FIG. 8, a sequence of operations of utilizing the secured communication channels in accordance with the presently disclosed subject matter is shown. In this example a coded data is communicated from the remote computer (e.g. 104) to the peripheral component (e.g. display component 103), including (in 801) receiving in processor module 501 coded data transmitted by the authorized remote server 104 through said secured processor/remote server communication channel 503. As explained above, the coded data may not be decrypted by the processor module.

In 802, the coded data is transmitted from the processor 501 to the display peripheral component 103 through the secured communication channel $502_2$.

Next, in 803 the coding module of the display peripheral component is utilized to decrypt said coded data, thereby achieving secured communication between the display peripheral and authorized server computer 104, irrespective of the utilization of said processor module 501.

Note that whereas the peripheral components exemplified in the first aspect (described with reference to FIG. 1) and the second aspect (described with reference to FIG. 5) where one-directional by nature keyboard outgoing and display incoming are used, in accordance with other embodiments, other bi-directional peripheral components may be used for sending and receiving coded data to and from the remote computer.

Note that in the context of FIGS. 6 to 8 the term coded data should be construed to include, as variants thereof, e.g. including additional data added by the processor 501.

Note also that in accordance with certain embodiments, the two architectures (e.g. of FIGS. 1 and 5) may be combined, allowing the peripheral component to communicate directly with the remote computer or through the processor module, whichever the case may be, and likewise the remote computer may communicate directly with the peripheral component, or through the computer.

It is noted that the teachings of the presently disclosed subject matter are not bound by neither any of the flow charts illustrated in FIGS. 6 to 8, nor by the specific modules illustrated in FIG. 5. For instance, the illustrated operations can occur out of the illustrated order. Some of the operations may be executed substantially concurrently or in the reverse order.

Figure 9:
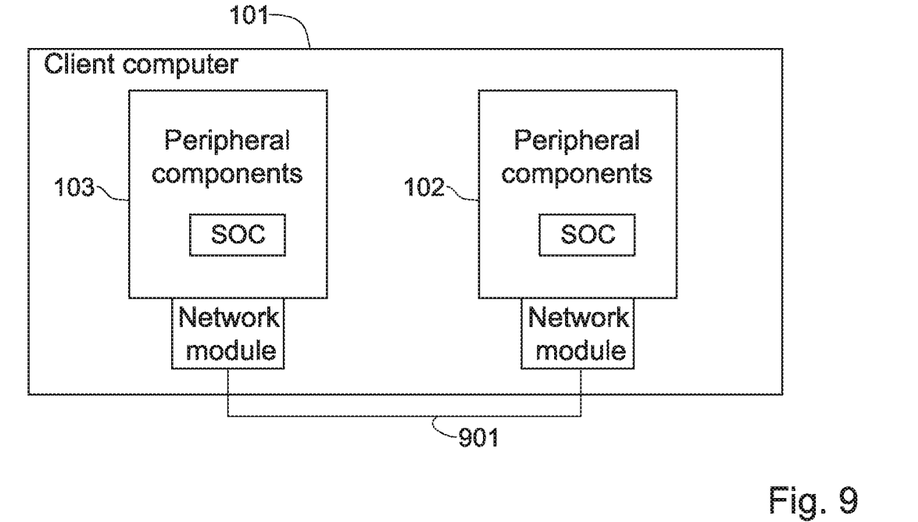
FIG. 9 illustrates a functional block diagram of a system for providing a secured client computer, in accordance with certain embodiments of yet another aspect of the presently disclosed subject matter.

Turning now to another aspect of the invention, attention is drawn to FIG. 9 illustrating a functional block diagram of a system for providing a secured client computer, in accordance with certain embodiments of the presently disclosed subject matter.

The peripheral components (e.g. 102 and 103—and possibly others not shown in FIG. 9) are similar to those described with reference to FIGS. 1 and 2, and may be accommodated in client computer 101. Note, that by this embodiment, the usage of a processor module that is susceptible of being compromised (e.g. 501 of FIG. 5) as well as a remote computer (e.g. 104), may be obviated.

Accordingly, in accordance with certain embodiments, each of the peripheral components (say 103) may establish a secured peer-to-peer communication channel (901) directly to another peripheral component (say 102). An establishment of such a secured communication channel may include establishing of a communication key (e.g. a symmetric key) known to only the respective group of peripheral components. The communication key is usable for the data coding between the respective peripheral components, all as explained below.

Figure 10:
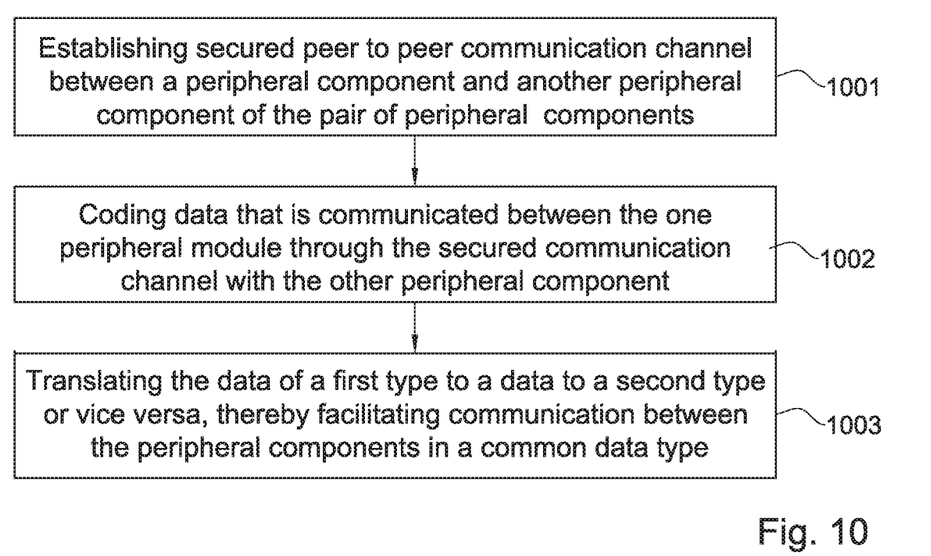
FIG. 10 illustrates a generalized flow-chart of a sequence of operations for generating a secured communication channel in a system of FIG. 9, in accordance with certain embodiments of the presently disclosed subject matter.

Turning now to FIG. 10, it illustrates a generalized flow-chart of a sequence of operations in a system of FIG. 9, in accordance with certain embodiments of the presently disclosed subject matter.

At the onset, a secured peer-to-peer communication channel is established (1001) between the one peripheral component (say 102) and the other peripheral component (102) of the group of peripheral modules.

Next (1002), the coding module (see FIG. 2) of say peripheral component 102 may be utilized to code data that is communicated between the one peripheral component through the secured communication channel with said other peripheral component; the coded data is undecryptable by the coding modules of other (in accordance with certain embodiments all other) peripheral components (not shown in FIG. 9).

The data compatibility module (see FIG. 3) of either or both of the peripheral components of the group may be utilized (1003) to translate data of said first type to a data of said second type or vice versa, thereby facilitating communication between said peripheral components in a common data type.

Figure 11:
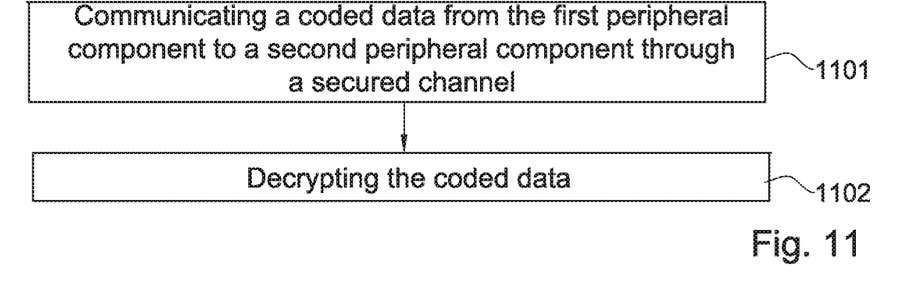
FIG. 11 illustrates a sequence of operations for utilizing the secured communication channels established e.g. in accordance with the flow chart of FIG. 9, in accordance with certain embodiments of the presently disclosed subject matter.

With reference to FIG. 11, a sequence of operations of utilizing the secured communication channels in accordance with the presently disclosed subject matter is shown. In this example a coded data is communicated from the first peripheral (e.g. keyboard 102) to the peripheral component (e.g.

display component 103) including (in 1101) transmitting coded data through secured channel 901.

Next, in 1102 the coding module of the display peripheral component is utilized to decrypt said coded data, thereby achieving secured communication between the display peripheral and keyboard peripheral 104.

In either of the first and second peripherals of the group, a data compatibility module may be utilized 1103 to translate the data to a common data type (in the latter example, a keyboard and display).

Note that the coded data (say the coded keystrokes) may not be decrypted by any other peripheral component (apart from the other peripheral component in the group) because the coded data was generated by using a communication key (say a symmetric key) known to the peripheral components (say 102 and 103) and possibly only to them.

Note that the peripheral to peripheral secured communication channel facilitates direct secured communication not through a remote computer (as was with certain embodiments of the first aspect of the invention described with reference to FIGS. 3 and 4 above). Consider, for example, a password that is keyed-in in the keyboard peripheral component (say 102) and displayed at the display peripheral component (say 103). By virtue of the so-obtained transport security and payload security, the likelihood of compromising any of the components or of the channel, is lower than non-secured components/channels, and, therefore, in accordance with certain embodiments of the third aspect of the invention, communication of sensitive data, such as passwords, is feasible even without utilizing the remote computer. In cases where the data types between the peripherals is non compatible—say keyboard related data type vs. display related data type, the data compatibility module (say a driver) may provide common data type for translating, for instance, keystrokes into displayed pixels)—all as known per se.

Note also that whereas the peripheral components exemplified in the first aspect (described with reference to FIG. 1) and the second aspect (described with reference to FIG. 5) and the third aspect (described with reference to FIG. 9) where they are one-directional by nature (keyboard outgoing and display incoming), other bi-directional peripheral components may be used for sending and receiving coded data to and from the remote computer.

Note also that in accordance with certain embodiments, the two architectures (e.g. of FIGS. 1 and 9) may be combined, allowing the peripheral component to communicate with another peripheral component through the remote computer, and/or directly.

Note also that the description refers a group of peripheral components (e.g. in the context of secured communication channel or e.g. sharing communication key, etc.) it may apply to two peripheral components or in accordance with certain embodiments of the presently disclosed subject matter to more than two (say three or more). Likewise whenever reference is made to peripheral component and remote computer it likewise applies in accordance with certain embodiments of the presently disclosed subject matter to two or more peripheral components and a remote computer e.g. in the context of secured communication channel or e.g. sharing communication key.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Usage of conditional language, such as "may", "can", or variants thereof should be construed as conveying that one or more examples of the subject matter may include, while one or more other examples of the subject matter may not necessarily include, certain methods, procedures, components and features. Thus such conditional language is not generally intended to imply that a particular described method, procedure, component or circuit is necessarily included in all examples of the subject matter. Moreover, the usage of non-conditional language does not necessarily imply that a particular described method, procedure, component or circuit is necessarily included in all examples of the subject matter.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A computer implemented method for providing communication between a secured client computer and a remote computer, comprising:
   (a) providing a client computer that includes at least two peripheral components; each peripheral component is configured, by a processor, to process a corresponding peripheral component data of a data type that is not compatible with peripheral component data types processed by a processor of other of said at least two peripheral components; the processor of each peripheral component is further configured to code the corresponding data of said data type;
   the method further comprising with respect to each peripheral component of said components, by said processor:
   (b) establishing a secured peer-to-peer communication channel between the peripheral component and the remote computer that is authorized to communicate with said client computer; and
   (c) coding data that is communicated between the authorized remote computer and the peripheral component through said secured communication channel, said coded data being indecryptable by the processors of other of said peripheral components;

wherein two of said at least two peripherals are keyboard and display respectively, and wherein the processor in said keyboard is configured to process corresponding data of keystrokes data type and the processor in said display is configured to process corresponding data of display data type.

2. The method according to claim 1, wherein said stage (b) further includes:
   i. authenticating the remote computer using a non-symmetric key that includes a public key of the remote computer;
   ii. authenticating the peripheral component using a non-symmetric key that includes a private key known to the peripheral component;
   iii. establishing a communication key known to the authenticated remote computer and the authenticated peripheral component, the communication key being usable for the data coding between the client computer and the remote computer.

3. The method according to claim 1, wherein said coding data for communicating through said secured communication channel includes:
   iv. encrypting data for transmission through said secured communication channel; or
   v. decrypting data received through said secured communication channel.

4. The method according to claim 1, wherein said client computer is devoid of a processor module that is separated from any of said at least two peripheral components and wherein the communication between said client computer and remote computer is achieved by means of said at least two peripheral components.

5. The method according to claim 1, wherein said client computer further includes processor module that is susceptible of being compromised and further being separated from any of said at least two peripheral components; and wherein said stage (b) further includes:
   establishing a secured peer-to-peer communication channel between the peripheral component and the processor module; and wherein a secured processor/remote computer peer to peer communication channel is established between the processor module and the remote computer.

6. The method according to claim 5, wherein said stage (c), further comprises:
   C1 coding said data giving rise to coded data;
   C2 transmitting said coded data to the processor module through said secured communication channel; and
   for transmitting said coded data from the processor module to the authorized remote computer through said secured processor/remote computer communication channel; said coded data is not decryptable by said processor module that is susceptible to being compromised, thereby achieving secured communication between the peripheral component and authenticated remote computer irrespective of the utilization of said processor module.

7. The method according to claim 1, wherein for at least one group of said peripheral components, said processor is capable of translating data of a first data type associated with one module of said group to data of a second non compatible type of the other module of said group; the method further comprising:
   d) establishing a secured peer to peer communication channel with other peripheral component of said group of peripheral components;
   e) coding data for communicating between the one peripheral component through said secured communication channel with said other peripheral component; said coded data is indecryptable by other of said peripheral components apart from said group; and
   f) translating data of said first type to a data of said second type or vice versa, thereby facilitating communication between said group of peripheral components in a common data type.

8. The method according to claim 1, wherein said remote computer resides in the cloud.

9. A computer implemented method for providing a communication between a secured client computer and a remote computer comprising:
   a. providing a client computer that includes at least two peripheral components; each peripheral component is configured, by a processor, to process a corresponding peripheral component data of a data type that is not compatible with peripheral component data types processed by processor of other of said at least two peripheral components; the processor of each peripheral component is further configured to code the corresponding data of said data type; said client computer further includes a processor module that is susceptible of being compromised and further being separated from any of said at least two peripheral components; the method further comprising with respect to each peripheral component of said modules:
   b. establishing a secured peer-to-peer communication channel between the peripheral component and the remote computer that is authorized to communicate with said client computer; said establishing secured communication channel includes establishing a communication key known to the remote computer and the peripheral component, the communication key is usable for the data coding between the peripheral component and the remote component;
   c. establishing a secured peer-to-peer communication channel between the peripheral component and the processor module; and wherein a secured processor/remote computer peer-to-peer communication channel is established between the processor module and the remote computer;
   wherein two of said at least two peripherals are keyboard and display respectively, and wherein the processor in said keyboard is configured to process corresponding data of keystrokes data type and the processor in said display is configured to process corresponding data of display data type.

10. The method according to claim 9, further comprising:
    d. coding data giving rise to coded data;
    e. transmitting said coded data to the processor module through said secured communication channel; and
    for transmitting said coded data from the processor module to the authorized remote computer through said secured processor/remote computer communication channel; said coded data is not decryptable by said processor module that is susceptible to being compromised, thereby achieving secured communication between the client computer and authenticated remote computer, irrespective of the utilization of said processor module that is susceptible of being compromised.

11. The method according to claim 9, further comprising:
    f. receiving by the processor module coded data transmitted by the authorized remote computer through said secured processor/remote computer communication channel; said coded data is not decryptable by said processor module, g. receiving said coded data by the peripheral component through a corresponding secured communication channel, and by the processor of said peripheral component, h. decrypting said coded data, thereby achieving secured communication between the peripheral component and authorized remote computer, irrespective of the utilization of said processor module that is susceptible of being compromised.

12. A computer implemented system for providing communication between a secured client computer and a remote computer, comprising:

a client computer that includes at least two peripheral components; each peripheral component is configured, by a processor, to process a corresponding peripheral component data of a data type that is not compatible with peripheral component data types processed by a processor of other of said at least two peripheral components; the processor of each peripheral component is further configured to code the corresponding data of said data type;

each peripheral component of said components, by said processor is configured :

to establish a secured peer-to-peer communication channel between the peripheral component and the remote computer that is authorized to communicate with said client computer; and to code data that is communicated between the authorized remote computer and the peripheral component through said secured communication channel, said coded data being indecryptable by the processors other of said peripheral components;

wherein two of said at least two peripherals are keyboard and display respectively, and wherein the processor in said keyboard is configured to process corresponding data of keystrokes data type and the processor in said display is configured to process corresponding data of display data type.

13. The system according to claim 12, wherein said client computer is devoid of a processor module that is separated from any of said at least two peripheral components and wherein the communication between said client computer and remote computer is achieved by means of said at least two peripheral components.

14. The system according to claim 12, wherein the processor of said remote computer is configured to receive, from a first authenticated peripheral component of said components and through a corresponding first trusted channel, a coded data of a first data type, decoding it using a first communication key associated with said first peripheral component and translating it to a processable data; said processor is further configured to translate processable data to data of a second data type, code it with a second communication key associated with a second authenticated peripheral component and transmit it through a corresponding second trusted channel to said second authenticated peripheral component.

15. The system according to claim 12, wherein said remote computer resides in the cloud.

16. A computer implemented system for providing a communication between a secured client computer and a remote computer comprising:

a client computer that includes at least two peripheral components; each peripheral component is configured, by a processor, to process a corresponding peripheral component data of a data type that is not compatible with peripheral component data types processed by processor of other of said at least two peripheral components; the processor of each peripheral component is further configured to code the corresponding data of said data type; said client computer further includes a processor module that is susceptible of being compromised and further being separated from any of said at least two peripheral components;

each peripheral component of said components, by said processor is configured :

to establish a secured peer-to-peer communication channel between the peripheral component and the remote computer that is authorized to communicate with said client computer, including establishing a communication key known to the remote computer and the peripheral component, the communication key is usable for the data coding between the peripheral component and the remote component;

to establish a secured peer-to-peer communication channel between the peripheral component and the processor module; and wherein a secured processor/remote computer peer to peer communication channel is established between the processor module and the remote computer;

wherein two of said at least two peripherals are keyboard and display respectively, and wherein the processor in said keyboard is configured to process corresponding data of keystrokes data type and the processor in said display is configured to process corresponding data of display data type.

17. A non-transitory computer-readable memory tangibly embodying a program of instructions executable by the computer for executing a computer implemented method for providing communication between a secured client computer and a remote computer, comprising (a) providing a client computer that includes at least two peripheral components; each peripheral component is configured, by a processor, to process a corresponding peripheral component data of a data type that is not compatible with peripheral component data types processed by a processor of other of said at least two peripheral components; the processor of each peripheral component is further configured to code the corresponding data of said data type;

the method further comprising with respect to each peripheral component of said components, by said processor:

(b) establishing a secured peer-to-peer communication channel between the peripheral component and the remote computer that is authorized to communicate with said client computer; and (c) coding data that is communicated between the authorized remote computer and the peripheral component through said secured communication channel, said coded data being indecryptable by the processors of other of said peripheral components;

wherein two of said at least two peripherals are keyboard and display respectively, and wherein the processor in said keyboard is configured to process corresponding data of keystrokes data type and the processor in said display is configured to process corresponding data of display data type.

18. A non-transitory computer-readable memory tangibly embodying a program of instructions executable by the computer for executing a computer implemented method for providing a communication between a secured client computer and a remote computer comprising:
  a. providing a client computer that includes at least two peripheral components; each peripheral component is configured, by a processor, to process a corresponding peripheral component data of a data type that is not compatible with peripheral component data types processed by processor of other of said at least two peripheral components; the processor of each peripheral component is further configured to code the corresponding data of said data type; said client computer further includes a processor module that is susceptible of being compromised and further being separated from any of said at least two peripheral components; the method further comprising with respect to each peripheral component of said modules:
  b. establishing a secured peer-to-peer communication channel between the peripheral component and the remote computer that is authorized to communicate with said client computer; said establishing secured communication channel includes establishing a communication key known to the remote computer and the peripheral component, the communication key is usable for the data coding between the peripheral component and the remote component;
  c. establishing a secured peer-to-peer communication channel between the peripheral component and the processor module; and wherein a secured processor/remote computer peer-to-peer communication channel is established between the processor module and the remote computer;
wherein two of said at least two peripherals are keyboard and display respectively, and wherein the processor in said keyboard is configured to process corresponding data of keystrokes data type and the processor in said display is configured to process corresponding data of display data type.

* * * * *